(12) United States Patent
Cole et al.

(10) Patent No.: US 10,027,948 B2
(45) Date of Patent: Jul. 17, 2018

(54) METHODS AND APPARATUS INCLUDING OR FOR USE WITH ONE OR MORE CAMERAS

(71) Applicant: NextVR Inc., Laguna Beach, CA (US)

(72) Inventors: David Cole, Laguna Beach, CA (US); Alan McKay Moss, Laguna Beach, CA (US)

(73) Assignee: NextVR Inc., Newport Beach, CA (US)

( * ) Notice: Subject to any disclaimer, the term of this patent is extended or adjusted under 35 U.S.C. 154(b) by 322 days.

(21) Appl. No.: 14/718,028

(22) Filed: May 20, 2015

(65) Prior Publication Data

US 2015/0341617 A1    Nov. 26, 2015

Related U.S. Application Data

(60) Provisional application No. 62/001,049, filed on May 20, 2014, provisional application No. 62/001,137, (Continued)

(51) Int. Cl.
*H04N 13/02* (2006.01)
*H04N 5/225* (2006.01)
(Continued)

(52) U.S. Cl.
CPC ......... *H04N 13/0242* (2013.01); *F16M 11/08* (2013.01); *F16M 11/242* (2013.01); (Continued)

(58) Field of Classification Search
None
See application file for complete search history.

(56) References Cited

U.S. PATENT DOCUMENTS 2,545,465 A * 3/1951 Hough ................. G03B 35/08
                                          396/325
5,870,642 A * 2/1999 Mittelstaedt ......... F16M 11/041
                                          116/213
(Continued)

FOREIGN PATENT DOCUMENTS

WO    WO2014117266    8/2014

OTHER PUBLICATIONS

International Search Report from International Application No. PCT/US 2015/031850, pp. 1-3, dated Aug. 27, 2015.
(Continued)

*Primary Examiner* — WB Perkey
(74) *Attorney, Agent, or Firm* — Straub & Straub; Michael P. Straub; Stephen T. Straub

(57) ABSTRACT

Camera related methods and apparatus which are well suited for use in capturing stereoscopic image data, e.g., pairs of left and right eye images, are described. Various features relate to a camera rig which can be used to mount multiple cameras at the same time. In some embodiments the camera rig includes 3 mounting locations corresponding to 3 different directions 120 degrees apart. One or more of the mounting locations may be used at a given time. When a single camera pair is used the rig can be rotated to capture images corresponding to the locations where a camera pair is not mounted. Static images from those locations can then be combined with images corresponding to the forward direction to generate a 360 degree view. Alternatively camera pairs or individual cameras can be included in each of the mounting locations to capture video in multiple directions.

8 Claims, 7 Drawing Sheets

Related U.S. Application Data filed on May 21, 2014, provisional application No. 62/128,844, filed on Mar. 5, 2015.

(51) Int. Cl.

| | |
|---|---|
| *H04N 5/232* | (2006.01) |
| *G03B 17/56* | (2006.01) |
| *G03B 35/08* | (2006.01) |
| *G03B 37/04* | (2006.01) |
| *F16M 11/08* | (2006.01) |
| *F16M 11/24* | (2006.01) |
| *H04N 5/262* | (2006.01) |
| *H04N 5/247* | (2006.01) |

(52) U.S. Cl.
CPC ........... *G03B 17/561* (2013.01); *G03B 35/08* (2013.01); *G03B 37/04* (2013.01); *H04N 5/2251* (2013.01); *H04N 5/23238* (2013.01); *H04N 5/247* (2013.01); *H04N 5/2628* (2013.01); *H04N 13/0246* (2013.01); *H04N 2213/001* (2013.01)

(56) References Cited

U.S. PATENT DOCUMENTS

| | | | | |
|---|---|---|---|---|
| 6,023,588 A * | 2/2000 | Ray | ........................ | G03B 35/08 348/E13.014 |
| 6,301,447 B1 * | 10/2001 | Jackson | ............... | G03B 17/561 348/50 |
| 7,548,273 B2 * | 6/2009 | Wada | ................... | H04N 5/2254 348/373 |
| 9,185,391 B1 * | 11/2015 | Prechtl | .................... | G06T 7/593 |
| 9,213,220 B2 * | 12/2015 | Fowler | .................... | G03B 17/56 |
| 2006/0072020 A1 * | 4/2006 | McCutchen | ........... | G03B 17/02 348/218.1 |
| 2006/0103723 A1 | 5/2006 | Scire, Jr. | | |
| 2007/0014347 A1 * | 1/2007 | Prechtl | .................... | H04N 5/232 375/240.01 |
| 2007/0291143 A1 * | 12/2007 | Barbieri | ................. | H04N 5/232 348/264 |
| 2008/0278571 A1 | 11/2008 | Mora et al. | | |
| 2010/0245539 A1 * | 9/2010 | Lin | ...................... | H04N 5/2258 348/36 |
| 2011/0249100 A1 | 10/2011 | Jayaram et al. | | |
| 2012/0105574 A1 * | 5/2012 | Baker | .................... | G03B 35/08 348/36 |
| 2012/0154519 A1 | 6/2012 | Zargarpour et al. | | |
| 2014/0153916 A1 * | 6/2014 | Kintner | ................ | G03B 17/561 396/419 |
| 2015/0341617 A1 * | 11/2015 | Cole | .................... | G03B 17/561 348/36 |
| 2016/0212409 A1 * | 7/2016 | Cole | ................... | H04N 13/0022 |
| 2016/0344999 A1 * | 11/2016 | Lajeunesse | ........ | H04N 5/23238 |
| 2016/0352982 A1 * | 12/2016 | Weaver | .............. | H04N 5/23238 |

OTHER PUBLICATIONS

Written Opinion of the International Searching Authority from International Application No. PCT/US 2015/031850, pp. 1-4, dated Aug. 14, 2015.

\* cited by examiner

US 10,027,948 B2

METHODS AND APPARATUS INCLUDING OR FOR USE WITH ONE OR MORE CAMERAS

RELATED APPLICATIONS

The present application claims the benefit of U.S. Provisional Patent Application Ser. No. 62/001,049 filed May 20, 2014, U.S. Provisional Patent Application Ser. No. 62/001,137 filed May 21, 2014 and U.S. Provisional Patent Application Ser. No. 62/128,844 filed Mar. 5, 2015 each of which is hereby expressly incorporated by reference in its entirety.

FIELD

Various embodiments relate to camera methods and apparatus and, more particularly, to camera apparatus and/or methods which are well suited for capturing image data, e.g., pairs of left and right eye images, in one or more directions.

BACKGROUND

The left and right eyes are separated from one another by a distance. As a result of this separation, each a persons left and right eyes will perceive a slightly different image of the environment based on the individual eye location. Differences between the left and right eye images are then interpreted by the person viewing a scene as providing depth information with the human perceiving a 3 dimensional (3D) image rather than two separate 2D images.

As 3D movies and other programs have grown in popularity, there is a growing desire for camera hardware and apparatus which can support capture of images that are suitable for use in generating 3D content, e.g., videos that may be used as part of a movie, advertisement, program, or even for viewing of an event in real or near real time.

Most camera rigs are intended to support capture of a single image. As the need for capturing stereoscopic image data, e.g., pairs of images which can be used as left and right eye images grows, there is a need for improved camera related apparatus which can be used to facilitate the capture of pairs of left and right eye images.

Camera alignment can be an important for useful capture of stereoscopic image data, e.g., pairs of left and right eye images. Such alignment issues are not present in non-stereo systems where a single camera is used to capture non-stereo image data.

While stereoscopic image capture in a single direction can be difficult using existing equipment, it maybe desirable to capture stereoscopic images in multiple directions to facilitate simulation of a environment in which a user may move, e.g., rotate, his or her head 360 degrees with the expectation of being able to see an image of the environment in all 360 degree directions.

When attempting to capture images covering a 360 degree area, which are to be used in simulating an environment that might be viewed when a user rotates his/her head, it is important that the capture images correspond reasonably to what a user would view if he was in the actual environment and rotated his/her head.

When capture of stereoscopic images corresponding to a 360 degree area is desired, the complexity with camera alignment and positioning is greatly complicated since stereoscopic images need to be captured in a manner that allows them to be stitched together since a single camera can not capture the full 360 degree field of view.

In addition to alignment issues it is desirable, for at least some applications that a camera rig be relatively small and portable so that it can be taken to event locations and used to capture images of an event where a larger fixed or tracked camera rig might not be able to fit. For example, in the case of many events it would be desirable to be able to place a camera rig at a position where an audience member or sports fan might normally sit to give a view a sense of being in the audience at the event.

Existing camera rigs and apparatus do not address many of the needs associated with capturing stereoscopic images whether that be in a single direction or in multiple directions.

In view of the above discussion it should be appreciated that there is a need for improvised camera related methods and apparatus. It would be desirable if at least some of the methods and/or apparatus addressed one or more of the above discussed problems with respect to capturing stereoscopic images such as facilitating camera alignment, camera rig size, camera rig portability and/or facilitating capture of stereoscopic image pairs corresponding to multiple different directions.

SUMMARY

Camera related methods and apparatus which are well suited for use in capturing stereoscopic image data, e.g., pairs of left and right eye images, in one or more directions are described.

Various features related to a camera rig and/or mounting platform which can be used to mount multiple cameras at the same time, e.g., one or more pairs of cameras used to capture left and right eye images. During use the camera rig may include one or more pairs of cameras at a given time.

In some embodiments the camera rig includes mounting locations for 3 pairs of cameras each pair being farcing in a direction 120 degrees from the direction of the other mounting location. When fully populated with camera pairs, the rig can capture images in 360 degrees.

When used with less than a full set of 3 camera pairs, the mounting platform which includes the mounting locations for the camera pairs can be rotated allowing for capture of stereoscopic image data in each direction. The captured images can be stored and used to provide background and/or side view in the event a user turns his or her head to a portion for which video is not being captured. For example, one pair of cameras may be used to capture stereoscopic video, e.g., a sequence of left and right eye images, with the previously captured images captures when the camera pair was rotated to a different image capture position being used as static image data.

Given the cost of high quality cameras and the risk associated with shipping and setting up such cameras, the ability to use one pair of cameras or a plurality of camera pairs can provide significant flexibility. Accordingly, for events where a single view is important the camera rig may be used with one pair of cameras. While at events where video corresponding to multiple view is important, the same camera rig can and sometimes is used with multiple pairs of cameras installed allowing for the capture of video form one or more camera positions at the same time.

In some but not necessarily all embodiments, the camera mounting positions are positioned on camera rig in a manner that the camera will capture images similar to what a viewer at an event might see if the viewers head were positioned at the center of the camera mounting platform. That is, the distance between the center of the lenses of each camera pair is set to approximate the distance between a viewers pupils while the distance between the camera sensor and the center of the camera mounting platform approximates the distance between the horizontal center of a viewers head and the viewer's retina. In this way, the pairs of camera's capture left and right eye images which are similar to what a user might see seated at the camera rig mounting position and facing in the direction of an individual camera pair.

To allow for easy shipment and assembly, the cameras may be removed from the camera right individually or as pairs. The position of the cameras in a pair can be adjusted as well as the position of a camera pair on the camera rig. This maybe done in some embodiments by loosening screws accessible from the top and/or bottom of the camera rig and moving the cameras or pair of cameras before retightening the screws.

The number or camera pairs used a the rig may vary from deployment to deployment. Rather than use a camera pair one, two or more of the camera pair mounting positions can be populated with a single camera. For example, in some embodiments a position corresponding to a forward looking view is populated with a camera pair to capture stereoscopic image data while other, e.g., left and right rear facing camera positions are populated with single cameras to capture mono images rather than stereoscopic image data.

In addition to capturing stereoscopic image pairs and/or mono image data, the camera rig can and in some embodiments is, equipped with a pair of microphones which used to capture stereo audio. The microphones are, in some embodiments, positioned in ear shaped devices which are positioned perpendicular to the direction of a forward facing camera pair. In this manner, the audio capture apparatus, e.g., microphones and simulated ears in which the microphones are located, simulate the capture of audio by ears of a real human in terms of the microphone spacing and direction as well as the direction of acoustic signals into an ear canal by a human shaped ear.

The audio capture features are not used in all embodiments but are used in at least some embodiments.

Numerous additional features benefits and embodiments are described in the detailed description which follows.

DETAILED DESCRIPTION

Figure 1:
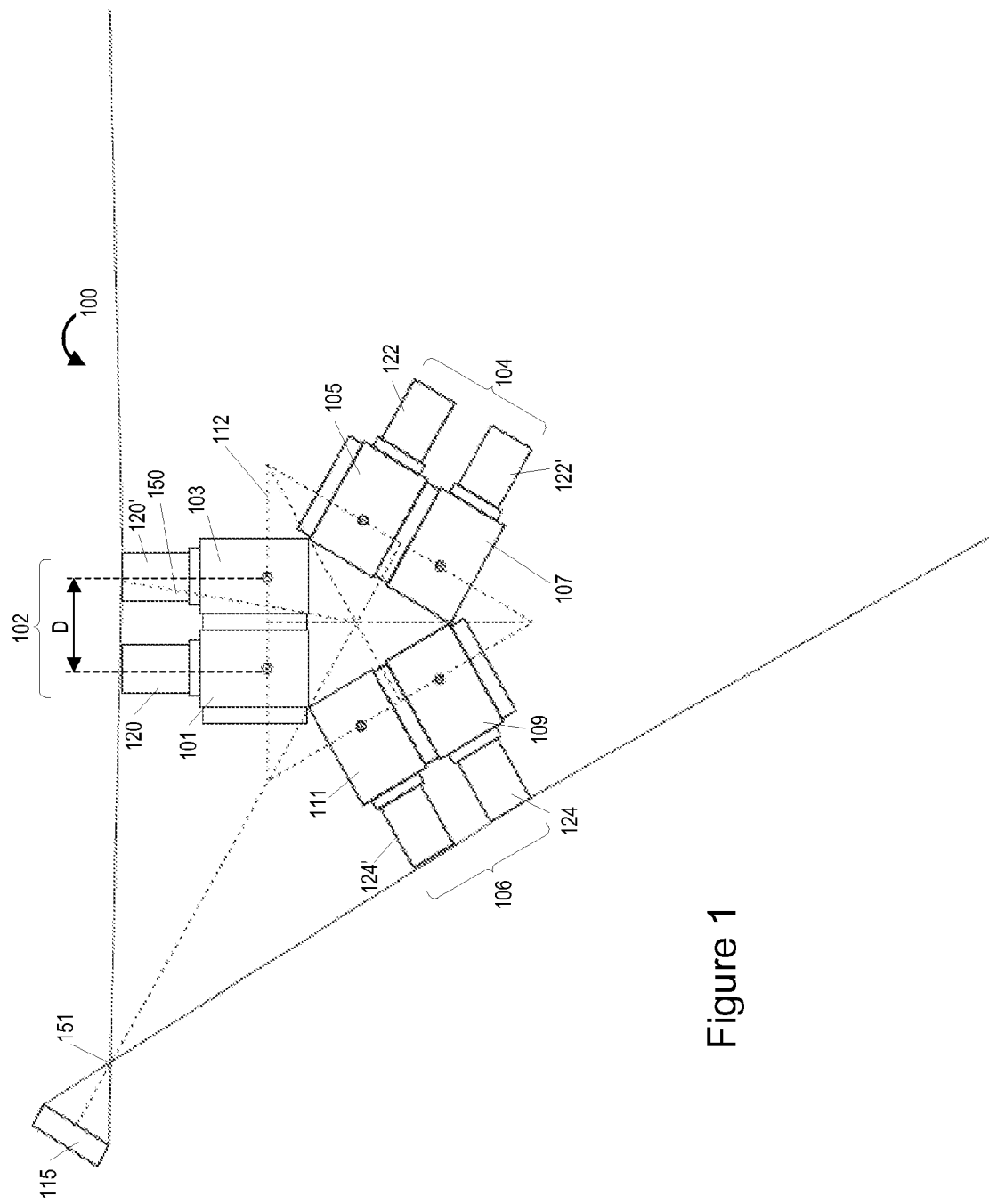
FIG. 1 illustrates a camera rig implemented in accordance with one embodiment along with a calibration target which may be used for calibrating the camera rig.

Camera methods and apparatus including camera apparatus and/or methods which are well suited for capturing stereoscopic image data, e.g., pairs of left and right eye images are described. Various features relate to the field of panoramic stereoscopic imagery and more particularly, to an apparatus suitable for capturing images, e.g., high-definition video images. The images may have a high dynamic range, high frame rate, and in some embodiments support 360-degree panoramic video. A camera rig implemented in accordance with various features may use one or more pairs of cameras and/or a camera pair in combination with one or more single cameras. The rig allows for a minimal number of cameras to be used for a given application in an apparatus of small size and at reasonable cost while satisfying weight, and power requirements for a wide range of applications.

Stereoscopic, 360-degree panoramic video content is increasingly in demand for use in virtual reality displays. In order to produce stereoscopic, 360-degree panoramic video content with 4K or greater of resolution, which is important for final image clarity, high dynamic range, which is important for recording low-light content, and high frame rates, which are important for recording detail in fast moving content (such as sports), an array of professional grade, large-sensor, cinematic cameras or of other cameras of suitable quality is often needed.

In order for the camera array to be useful for capturing 360-degree, stereoscopic content for viewing in a stereoscopic virtual reality display, the camera array should acquire the content such that the results approximate what the viewer would have seen if his head were co-located with the camera. Specifically, the pairs of stereoscopic cameras should be configured such that their inter-axial separation is within an acceptable delta from the accepted human-model average of 63 mm. Additionally, the distance from the panoramic array's center point to the entrance pupil of a camera lens (aka nodal offset) should be configured such that it is within an acceptable delta from the accepted human-model average of 101 mm (millimeters).

In order for the camera array to be used to capture events and spectator sports where it should be compact and non-obtrusive, it should be constructed with a relatively small physical footprint allowing it to be deployed in a wide variety of locations and shipped in a reasonable sized container when shipping is required. The camera array should also be designed, if possible, such that the minimum imaging distance of the array is small, e.g., as small as possible, which minimizes the "dead zone" where scene elements are not captured because they fall outside of the field of view of adjacent cameras. The camera rig of the present invention show in FIG. 1 and various other embodiments addresses one or more of these design goals.

It would be advantageous if the camera array included in the rig can be calibrated for optical alignment by positioning calibration targets where the highest optical distortion is prone to occur (where lens angles of view intersect AND the maximum distortion of the lenses occur). To facilitate the most efficacious calibration target positioning, target locations should, and in some embodiments are, determined formulaically from the rig design.

Figure 4:
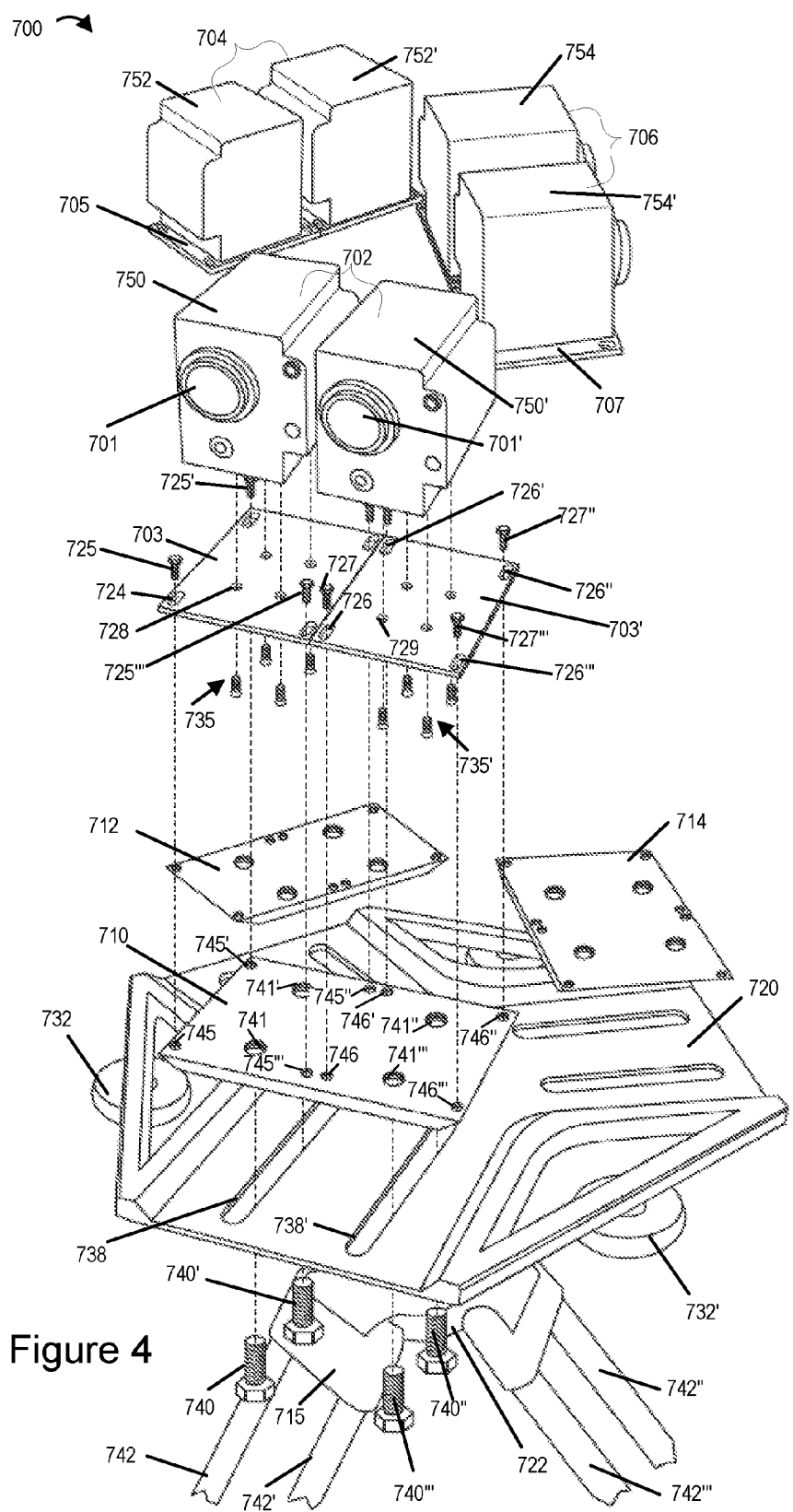
FIG. 4 illustrates another exemplary camera rig implemented in accordance with an exemplary embodiment with various elements of the camera rig being shown for clarity in partially disassembled form.
Figure 5:
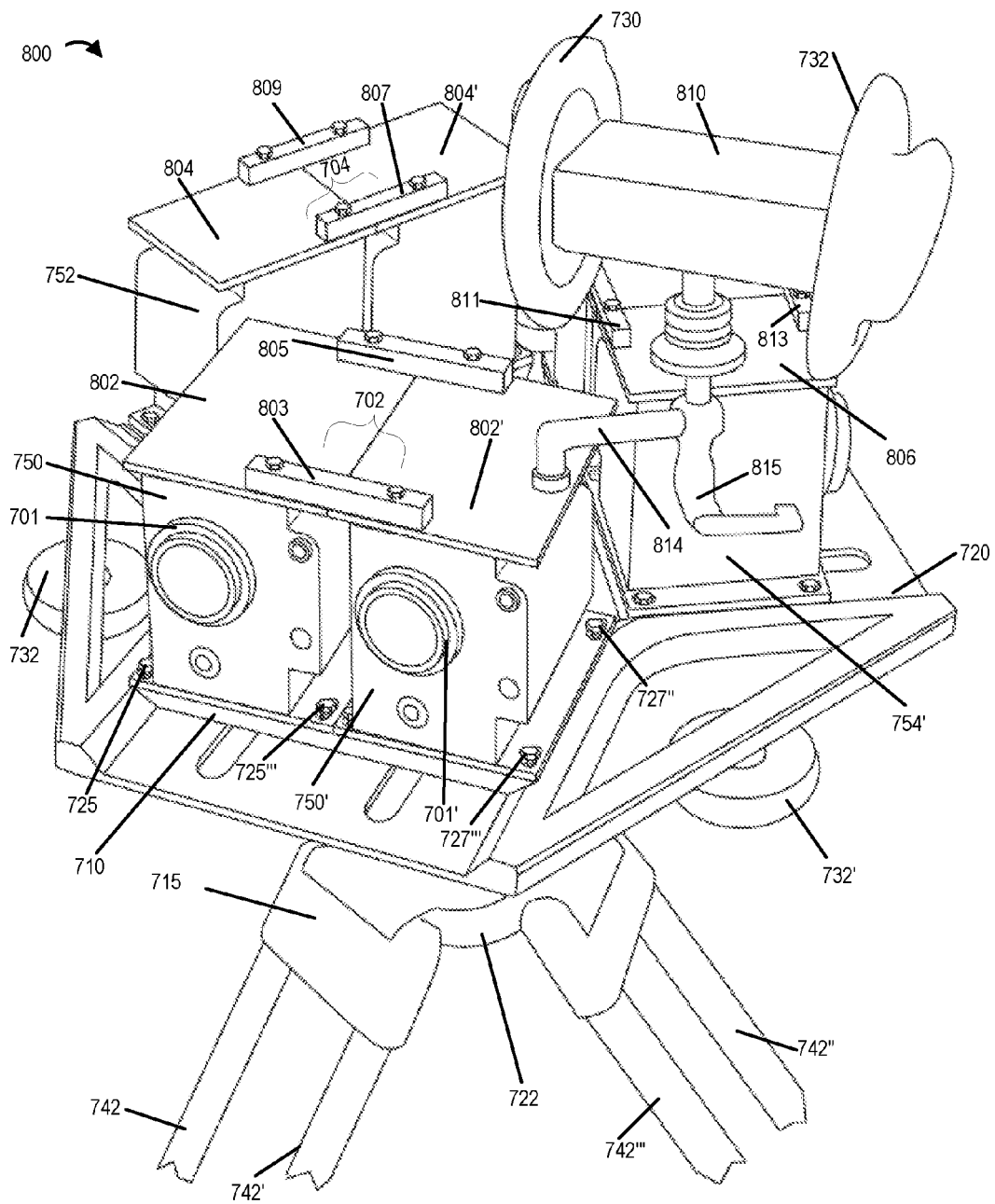
FIG. 5 shows the camera rig of FIG. 4 with the cameras mounted thereon along with an audio capture device including ear shaped devices including microphones used for capturing stereo audio.

FIG. 1 shows an exemplary camera configuration used in some embodiments. The support structure shown in FIGS. 4 and 5 is not shown in FIG. 1 to allow for better application of the camera pair arrangement shown used in some embodiments.

While in some embodiments three camera pairs are used such as in the FIG. 1 example in some but not all embodiments a camera array, e.g., the camera positions of the rig, is populated with only 2 of the 6-total cameras which maybe used to support simultaneous 360-degree stereoscopic video. When the camera rig or assembly is configured with less than all 6 cameras which can be mounted in the rig, the rig is still capable of capturing the high-value, foreground 180-degree scene elements in real-time while manually capturing static images of the lower-value, background 180-degree scene elements, e.g., by rotating the rig when the foreground images are not being captured. For example, in some embodiments when a 2-camera array is used to capture a football game with the field of play at the 0-degree position relative to the cameras, the array is manually rotated around the nodal point into the 120-degree and 240-degree positions. This allows the action on the field of a sports game or match, e.g., foreground, to be captured in real time and the sidelines and bleachers, e.g., background areas, to be captured as stereoscopic static images to be used to build a hybridized panorama including real time stereo video for the front portion and static images for the left and right rear portions. In this manner, the rig can be used to capture a 360 degree view with some portions of the 360 view being captured at different points in time with the camera rig being rotated around its nodal axis, e.g., vertical center point between the different points in time when the different view of the 360 scene area are captured. Alternatively, single cameras may be mounted in the second and third camera pair mounting positions and mono (non-stereoscopic) video captured for those areas.

In other cases where camera cost is not an issue, more than two cameras can be mounted in the rig with the rig holding up to 6 cameras in the FIG. 1 example. In this manner, cost effect camera deployment can be achieved depending on the performance to be captured and, the need or ability of the user to transport a large number, e.g., 6 cameras, or the user's ability to transport fewer than 6 cameras, e.g., 2 cameras.

FIG. 1 depicts a 6 camera assembly 100 also sometimes referred to as a rig or camera array, along with a calibration target 115. The camera rig 100 illustrated in FIG. 1 includes a support structure (shown in FIGS. 4 and 5) which holds the cameras in the indicated positions, 3 pairs 102, 104, 106 of stereoscopic cameras (101, 103), (105, 107), (109, 111) for a total of 6 cameras. The support structure includes a base 720 also referred to herein as a mounting plate (see element 720 shown in FIG. 4) which supports the cameras and to which plates on which the cameras are mounted can be secured. The support structure maybe made of plastic, metal or a composite material such as graphite or fiberglass, and is represented by the lines forming the triangle which is also used to show the spacing and relationship between the cameras. The center point at which the doted lines intersect represents the center nodal point around which the camera pairs 102, 104, 106 can be rotated in some but not necessarily all embodiments. The center nodal point corresponds in some embodiments to a steel rod or threaded center mount, e.g., of a tripod base, around which a camera support frame represented by the triangular lines can be rotated. The support frame may be a plastic housing in which the cameras are mounted or tripod structure as shown in FIGS. 4 and 5.

In FIG. 1, each pair of cameras 102, 104, 106 corresponds to a different camera pair position. The first camera pair 102 corresponds to a 0 degree forward to front facing position. This position normally corresponds to the main area of interest, e.g., a field upon which a sports game is being played, a stage, or some other area where the main action is likely to occur. The second camera pair 104 corresponds to a 120 degree camera position and is used to capture a right rear viewing area. The third camera pair 106 corresponds to a 240 degree viewing position and a left rear viewing area. Note that the three camera positions are 120 degrees apart.

Each camera viewing position includes one camera pair in the FIG. 1 embodiment, with each camera pair including a left camera and a right camera which are used to capture images. The left camera captures what are sometimes referred to as a left eye images and the right camera captures what is sometime referred to as right eye images. The images may be part of a view sequence or still image captured at one or more times. Normally at least the front camera position corresponding to camera pair 102 will be populated with high quality video cameras. The other camera positions may be populated with high quality video cameras, lower quality video cameras or a single camera used to capture still or mono images. In some embodiments the second and third camera embodiments are left unpopulated and the support plate on which the cameras are mounted is rotated allowing the first camera pair 102 to capture images corresponding to all three camera positions but at different times. In some such embodiments left and right rear images are captured and stored and then video of the forward camera position is captured during an event. The captured images may be encoded and streamed in real time, e.g. while an event is still ongoing, to one or more playback devices.

The first camera pair shown in FIG. 1 includes a left camera 101 and a right camera 103. The left camera has a first lens assembly 120 secured to the first camera and the right camera 103 has a second lens assembly secured to the right camera 103. The lens assemblies 120, 120' include lenses which allow for a wide angle field of view to be captured. In some embodiments each lens assembly 120, 120' includes a fish eye lens. Thus each of the cameras 102, 103 can capture a 180 degree field of view or approximately 180 degrees. In some embodiments less than 180 degrees is captured but there is still at least some overlap in the images captured from adjacent camera pairs in some embodiments. In the FIG. 1 embodiment a camera pair is located at each of the first (0 degree), second (120 degree), and third (240 degree) camera mounting positions with each pair capturing at least 120 degrees or more of the environment but in many cases with each camera pair capturing 180 degrees or approximately 180 degrees of the environment.

Second 104 and third 106 camera pairs are the same or similar to the first camera pair 102 but located at 120 and 240 degree camera mounting positions with respect to the front 0 degree position. The second camera pair 104 includes a left camera 105 and left lens assembly 122 and a right camera 107 and right lens assembly 122'. The third camera pair 106 includes a left camera 109 and left lens assembly 124 and a right camera 111 and right lens assembly 124'.

In FIG. 1, D represents the inter-axial distance of the first 102 stereoscopic pair of cameras 101, 103. In the FIG. 1 example D is 117 mm which is the same or similar to the distance between pupils of the left and right eyes of an average human being. Dashed line 150 in FIG. 1 depicts the distance from the panoramic array's center point to the entrance pupil of the right camera lens 120' (aka nodal offset). In one embodiment corresponding to the FIG. 1 which example the distance indicated by reference number 150 is 315 mm but other distances are possible.

In one particular embodiment the footprint of the camera rig 100 is relatively small with the horizontal area being 640 mm² or less. Such a small size allows the camera rig to be placed in an audience, e.g., at a seating position where a fan or attendance might normally be located or positioned. Thus in some embodiments the camera rig is placed in an audience area allowing a viewer to have a sense of being a member of the audience where such an effect is desired. The footprint in some embodiments corresponds to the size of the base to which the support structure including, in some embodiments a center support rod is mounted or support tower is located. As should be appreciated the camera rigs in some embodiments can rotate around the center point of the base which corresponds to the center point between the 3 pairs of cameras. In other embodiments the cameras are fixed and do not rotate around the center of the camera array.

The camera rig is capable of capturing relatively close as well as distinct object. In one particular embodiment the minimum imaging distance of the camera array is 649 mm but other distances are possible and this distance is in no way critical.

The distance from the center of the camera assembly to the intersection point 151 of the views of the first and third camera parts represents an exemplary calibration distance which can be used for calibrating images captured by the first and second camera pairs. In one particular exemplary embodiment, an optimal calibration distance, where lens angles of view intersect AND the maximum distortion of the lenses occur is 743 mm. Note that target 115 may be placed at a known distance from the camera pairs located at or slightly beyond the area of maximum distortion. The calibration target include a known fixed calibration pattern. The calibration target can be and is used for calibrating the size of images captured by cameras of the camera pairs. Such calibration is possible since the size and position of the calibration target is known relative to the cameras capturing the image of the calibration target 115.

Figure 2:
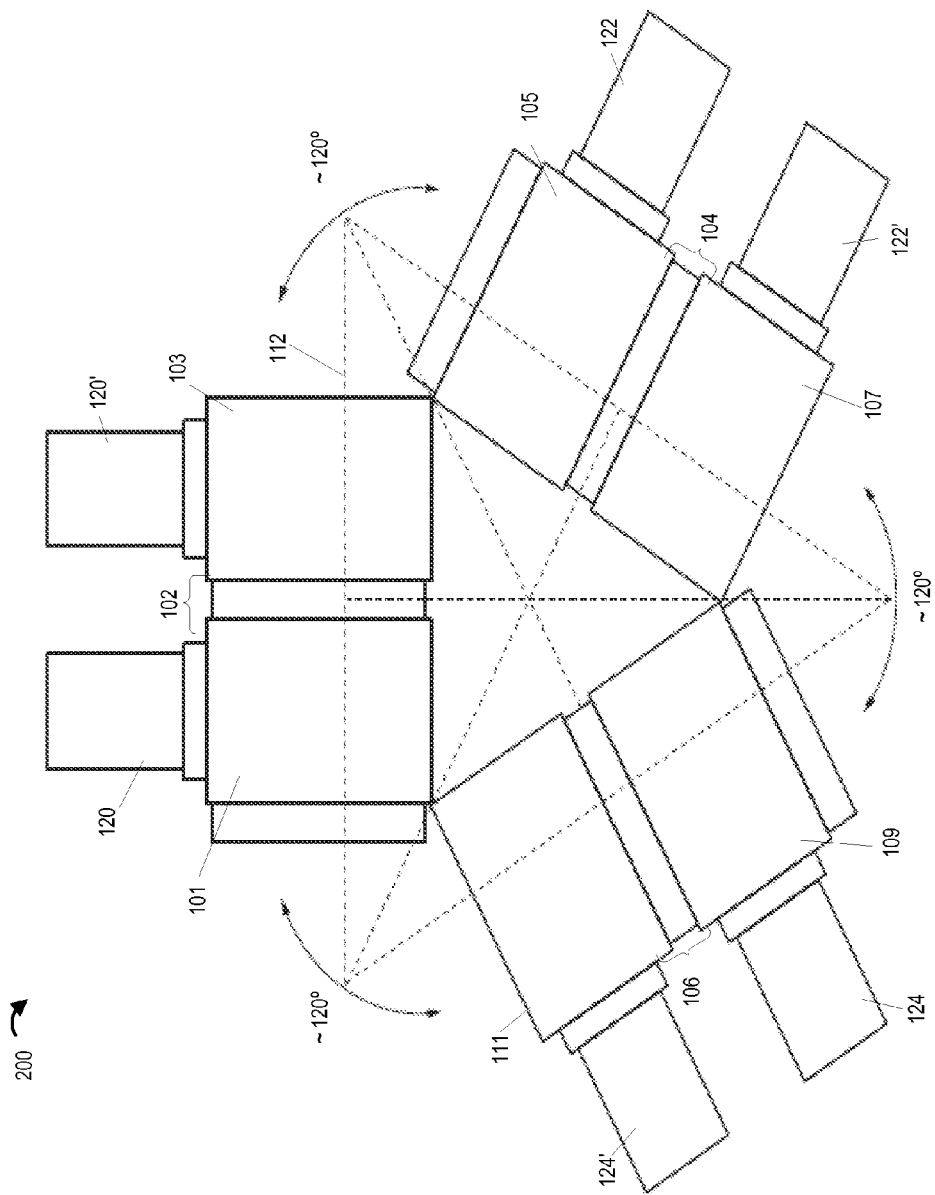
FIG. 2 illustrates the camera rig with three pairs of cameras, e.g., 3 pairs of cameras capturing stereoscopic image data, mounted in the camera rig.

FIG. 2 is a diagram 200 of the camera array shown in FIG. 1 in greater detail. While the camera rig is again shown with 6 cameras, in some embodiment the camera rig is populated with only two cameras, e.g., camera pair 102. As shown there is a 120 degree separation between each camera pair mounting positions. Consider for example if the center between each camera pair corresponds to the direction of the camera mounting position. In such a case the first camera mounting position corresponds to 0 degrees, the second camera mounting position corresponds to 120 degrees and the third camera mounting position corresponding to 240 degrees. Thus each camera mounting position is separated by 120 degrees. This can be seen if the center line extending out through the center of each camera pair 102, 104, 106 was extended and the angle between the lines measured.

In the FIG. 2 example, the pair 102, 104, 106 of cameras can, and in some embodiments do, rotate around the center point of the camera rig allowing for different views to be captured at different times without having to alter the position of the camera rig base. That is, the cameras can be rotated around the center support of the rig and allowed to capture different scenes at different times allowing for a 360 degree scene capture using the rig shown in FIG. 2 while it is populated with only two cameras. Such a configuration is particularly desirable from a cost perspective given the cost of stereoscopic cameras and is well suited for many applications where it may be desirable to show a background captured from the same point of view but at a different time than the time at which the front scene including the main action during a sporting event or other event may occur. Consider for example that during the event objects may be placed behind the camera that it would be preferable not to show during the main event. In such a scenario the rear images may be, and sometimes are, captured prior to the main event and made available along with the real time captured images of the main event to provide a 360 degree set of image data.

Figure 3:
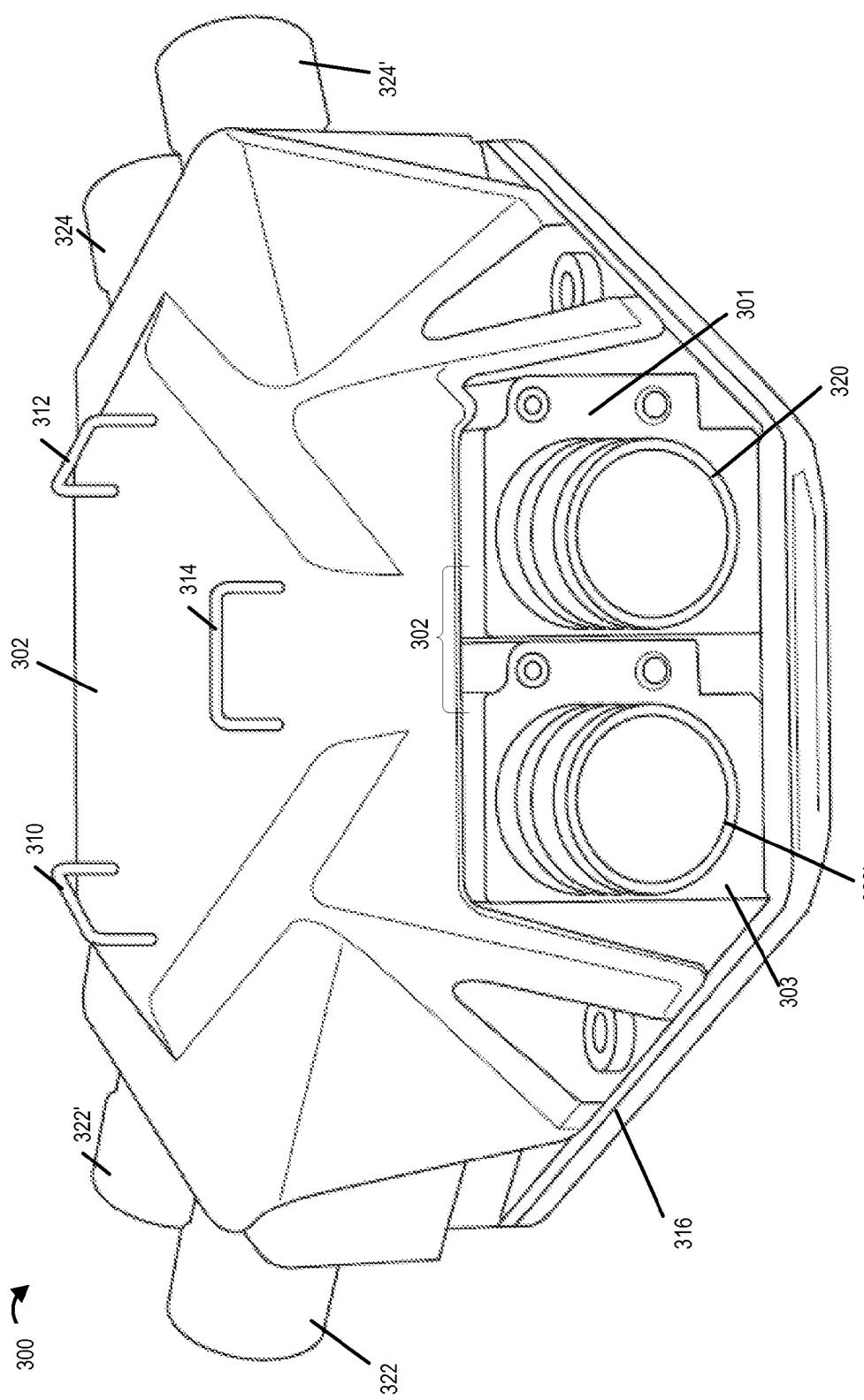
FIG. 3 illustrate a camera rig with an exemplary protective cover implemented in accordance with some exemplary embodiments.

FIG. 3 shows an exemplary camera rig 300 which the same or similar to the rig of FIGS. 1 and 2 without a support tripod and with a plastic cover 302 placed over the camera pairs. The plastic cover 302 includes handles 310, 312, 314 which can be used to lift or rotate, e.g., when placed on a tripod, the camera rig 302. The camera rig is shown with three pairs of cameras, a first pair 301, 302 with lens assemblies 320, 320', a second camera pair including lens assemblies 322, 322', and a third camera pair including lens assemblies 324, 324'/ The plastic cover is secured to the mounting platform 316, which may be implemented as a flat plate with one or more slots and screw holes as shown in FIG. 4. The plastic cover is secured to the based with nuts or screws 330, 331 which can be removed or tightened by hand to allow for easy removal or attachment of the cover 302 and easy access to the cameras of the camera pairs. While six cameras are include in rig shown in FIG. 3, a single camera pair may be included and/or a single camera pair with one or more individual cameras located at the other camera mounting positions where the camera pairs is not mounted.

FIG. 4 is a detailed diagram of a camera rig assembly 700 shown in partially disassembled form to allow better view of how the components are assembled.

The camera rig 700 is implemented in accordance with one exemplary embodiment and may have the camera configuration shown in FIGS. 1 and 2. In the example shown in FIG. 4 various elements of the camera rig 700 are shown in disassembled form for clarity and detail. As can be appreciated from FIG. 4, the camera rig 700 includes 3 pairs of cameras 702, 704 and 706, e.g., stereoscopic cameras, which can be mounted on a support structure 720 of the camera rig 700. The first pairs of cameras 702 includes camera 750 and 750'. The second pair of cameras 704 includes cameras 752, 752' and the third pair of cameras 706 includes cameras 754, 754'. The lenses 710, 701' of the cameras 750, 750' can be seen in FIG. 7. While elements 701 and 701' are described as lenses, in some embodiments they are lens assemblies which are secured to the cameras 750, 750' with each lens assembly including multiple lenses positioned in a lens barrel which is secured to the camera 750, 750' via a friction fit or twist lock connection.

In some embodiments the three pairs (six cameras) of cameras 702, 704 and 706 are mounted on the support structure 720 via the respective camera pair mounting plates 710, 712 and 714. The support stricter may be in the form of a slotted mounting plate 720. Slot 738 is exemplary of some of the slots in the plate 720. The slots reduce weight but also allow for adjustment of the position of the camera mounting plates 710, 712, 714 used to support camera pairs or in some cases a single camera.

The support structure 720 includes three different mounting positions for mounting the stereoscopic camera pairs 702, 704, 706, with each mounting position corresponding to a different direction offset 120 degrees from the direction of the adjacent mounting position. In the illustrated embodiment of FIG. 7, the first pair of stereoscopic cameras 702 is mounted in a first one of the three mounting positions, e.g., front position, and corresponds to a front viewing area. The second pair 704 of stereoscopic cameras 704 is mounted in a second one of the three mounting positions, e.g., background position rotating 120 degrees clockwise with respect the front position, and corresponds to a different right rear viewing area. The third pair 706 of stereoscopic cameras is mounted in a third one of the three mounting positions, e.g., background position rotating 240 degrees clockwise with respect the front position, and corresponds to a left rear viewing area. The cameras in each camera position capture at least a 120 viewing area but capture in many case at least a 180 degree viewing area resulting in overlap in the captured images which can facilities combining of the images into a 360 degree view with some of the overlapping portions being cut off in some embodiments.

The first camera pair mounting plate 710 includes threaded screw holed 741, 741', 741'' and 741''' through which screws 704, 740', 740'', 740'' can be inserted, respectively through slots 738 and 738; to secure the plate 710 to the support structure 720. The slots allow for adjustment of the position of the support plate 710.

The cameras 750, 750' of the first camera pair are secured to individual corresponding camera mounting plates 703, 703' using screws that pass through the bottom of the plates 703, 703' and extend into threaded holes on the bottom of the cameras 750, 750'.

Once secured to the individual mounting 703, 703' the cameras 750, 750' and mounting plates 703, 703' can be secured to the camera pair mounting plate 710 using screws. Screws 725, 725', 725'' (which is not fully visible) and 725''' pass through corresponding slots 724 into threaded holes 745, 745', 745'' and 745''' of the camera pair mounting plate 710 to secure the camera plate 703 and camera 750 to the camera pair mounting plate 710. Similarly, screws 727, 727'(which is not fully visible), 727'' and 7257'' pass through corresponding slots 726, 726', 726'' and 726''' into threaded holes 746, 746', 746'' and 746''' of the camera pair mounting plate 710 to secure the camera plate 703' and camera 750' to the camera pair mounting plate 710.

The support structure 720 has standoff rollers 732, 732' mounted to reduce the risk that an object moving past the support structure will get caught on the support structure as it moves nearby. This reduces the risk of damage to the support structure. Furthermore by having a hollow area inside behind the roller an impact to the support roller is less likely to be transferred to the main portion of the support structure. That is, the void behind the roller 732' allows for some deformation of the bar portion of the support structure on which the standoff roller 732' is mounted without damage to the main portion of the support structure including the slots used to secure the camera mounting plates.

In various embodiments the camera rig 700 includes a base 722 to which the support structure 720 is rotatable mounted e.g. by a shaft or threaded rod extending trough the center of the base into the support plate 720. Thus in various embodiments the camera assembly on the support structure 720 can be rotated 360 degrees around an axis that passes through the center of the base 722. In some embodiments the base 722 may be part of a tripod or another mounting device. The tripod includes legs formed by pairs of tubes (742, 742'), (742'' and 742'') as well as additional leg which is not visible in FIG. 4 due to the viewing angle. The legs are secured by a hinge to the base 722 and can be folded for transport. The support structure maybe made of plastic, metal or a composite material such as graphite or fiberglass or some combination thereof. The camera pairs can be rotated around a central point, sometimes referred to as center nodal point, in some embodiments.

The assembly 700 shown in FIG. 4 allows for the position of individual cameras to be adjusted from the top by loosing the screws securing the individual camera mounting plates to the camera pair mounting plate and then adjusting the camera position before retightening the screws. The position of a camera pair can be adjusted by moving the camera pair mounting plate after loosening the screws accessible from the bottom side of the support structure 720, moving the plate and then retightening the screws. Accordingly, what the general position and direction of the camera pairs is defined by the slots in the support plate 720, the position and direction can be finely adjusted as part of the camera calibration process to achieve the desired camera alignment while the cameras are secured to the support structure 720 in the field where the camera rig is to be used.

In FIG. 5 reference numbers which are the same as those used in FIG. 4 refer to the same elements. FIG. 5 illustrates a drawing 800 showing the exemplary camera rig 700 in assembled form with additional stabilization plates 802, 80', 804, 804', 806 and stabilization plate joining bars 803, 805, 807, 809, 811, 813 added to the tops of the camera pairs to increase the rigidity and stability of the cameras pairs after they have been adjusted to the desired positions.

In the drawing 800 the camera pairs 702, 704, 706 can be seen mounted on the support structure 720 with at least one of the camera pair mounting plate 710 being visible in the illustrated drawing. In addition to the elements of camera rig 700 already discussed above with regard to FIG. 7, in drawing 800 two simulated ears 730, 732 mounted on the camera rig can also be seen. These simulated ears 730, 732 imitate human ears and in some embodiments are made from silicone or plastic molded in the shape of a human ear. Simulated ears 730, 732 include microphones with the two ears being separated from each other by a distance equal to, or approximately equal to, the separation between human ears of an average human. The microphones mounted in the simulated ears 730, 732 are mounted on the front facing camera pair 702 but could alternatively be mounted dot the support structure, e.g., platform, 720. The simulated ears 730, 732 are positioned perpendicular to the front surface of the camera pair 702 in a similar manner as human ears are positioned perpendicular to the front surface of eyes on a human head. Holes in the side of the simulated ears 730, 732 act as an audio entry hole in the side of the simulated ears with the simulated ears and hole operating in combination to direct audio towards a microphone mounted in each one of the simulated ears much as a human ear directs audio sounds into the eardrum included in a human ear. The microphones in the left and right simulated ears 730, 732 provide for stereo sound capture similar to what a human at the location of the camera rig 800 would perceive via the human's left and right ears if located at the position of the camera rig. The audio input of the microphones mounted in the simulate ears is perpendicular to the face of the outer lens of front facing cameras 750, 750' in the same manner that the sensor portion of a human ear would be somewhat perpendicular to the humans beings face. The simulate ears direct sound into toward the microphone just as a human ear would direct sound waves towards a human ear drum.

The simulated ears 730, 730 are mounted on a support bar 810 which includes the microphones for capturing sound. The audio capture system 730, 732, 810 is supported by a movable arm 814 which can be moved via handle 815.

While FIGS. 4-5 illustrate one configuration of an exemplary camera rig with three stereoscopic camera pairs, it should be appreciated that other variations are possible. For example, in one implementation the camera rig 700 includes a single pair of stereoscopic cameras which can rotate around the center point of the camera rig allowing for different 120 degree views to be captured at different times.

Thus a single camera pair can be mounted on the support structure and rotated around the center support of the rig and allowed to capture different scenes at different times allowing for a 360 degree scene capture.

In other embodiments the camera rig 700 includes a single stereoscopic camera pair 702 and one camera mounted in each of the second and third positions normally used for a pair of stereoscopic cameras. In such an embodiment a single camera is mounted to the rig in place of the second camera pair 704 and another single camera is mounted to the camera rig in place of the camera pair 706. Thus, in such an embodiment, the second camera pair 704 may be thought of as being representative of a single camera and the camera pair 706 may be thought of as being illustrate of the additional signal camera.

An exemplary method of using the camera rig, e.g., camera rig 700, including a pair of stereoscopic cameras 702, in accordance with an embodiment, comprises: capturing a first 120 degree rear stereoscopic pair of images while the pair of stereoscopic cameras 702 is facing in a first direction, e.g., front position; capturing a second 120 degree rear stereoscopic pair of images while the pair of stereoscopic cameras is facing in a second direction; and capturing front facing stereoscopic pairs of images while the pair of stereoscopic cameras is facing in a front direction.

In some embodiments the method further comprises: rotating a support structure 720 in which the pair of stereoscopic cameras 702 are mounted between the time the first 120 degree rear stereoscopic pair of images is captured and the time the second 120 degree rear stereoscopic pair of images is captured.

In some embodiments the method further comprises: rotating the support structure 720 in which the pair of stereoscopic cameras 702 are mounted between the time the second 120 degree rear stereoscopic pair of images is captured and the time the front 120 degree pairs of images are captured.

Figure 6:
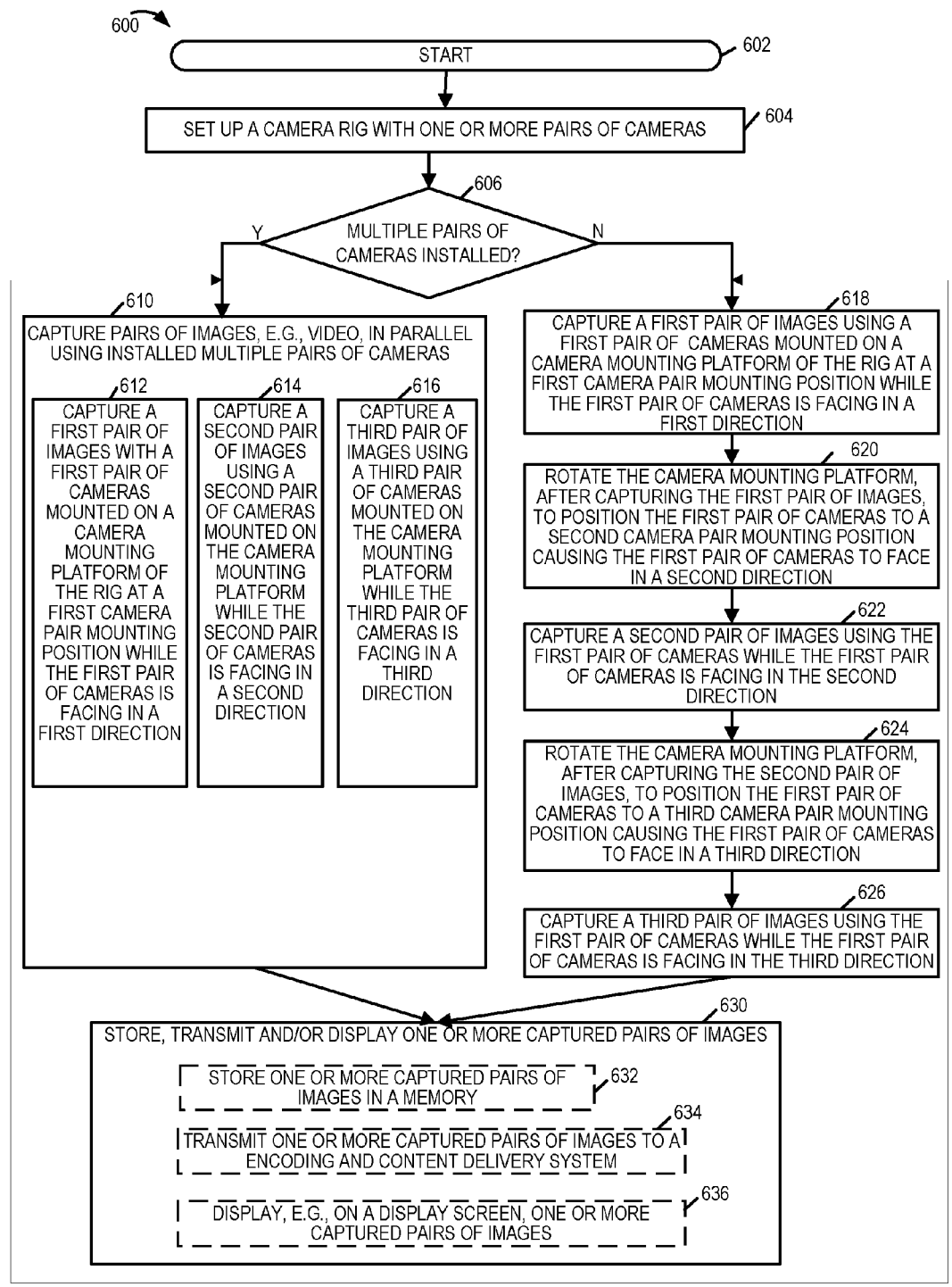
FIG. 6 is a flow chart showing a method which uses the exemplary camera rig shown in FIGS. 4 and 5 to capture images.

FIG. 6 shows a flowchart 600 illustrating the steps of an exemplary method of operating a camera rig, e.g., such as the ones shown in FIGS. 1-5, that includes at least one pair of cameras, in accordance with an exemplary embodiment.

In some embodiments a camera rig with a single pair of cameras mounted on it can be, and in some embodiments is, used to implement the method of flowchart 600. The operation path including steps 618 through 630 describe this approach. In some other embodiments more than one camera pair, e.g., three pairs of cameras, are mounted on the camera rig. The path including steps 610 (including steps 612, 614, 616) and 630 describe this approach.

The exemplary method starts in step 602, e.g., with the camera rig being prepared to be set up for operation. Operation proceeds from start step 602 to step 604 where the camera rig with one or more pairs of cameras is set up. During the set up of the camera rig, a single pair of cameras or multiple camera pairs may be mounted on a mounting platform of the camera. Operation proceeds from step 604 to step 606. In step 606 it is determined whether single pair of cameras or multiple pairs of cameras are installed on the camera rig. If it is determined that multiple camera pairs are installed, the operation proceeds from step 606 to step 610 otherwise the operation proceeds to step 618.

In step 610 pairs of images are captured in parallel, using the installed multiple pairs of cameras on the camera rig. In some embodiments step 610 includes sub-steps 612, 614 and 614 which are performed as part of implementing step 610. In sub-step 612 a first pair of images is captured using a first pair of cameras mounted on a camera mounting platform of the camera rig at a first camera pair mounting position while the first pair of cameras is facing in a first direction. In sub-step 614 a second pair of images is captured using a second pair of cameras mounted on the camera mounting platform of the camera rig at a second camera pair mounting position while the second pair of cameras is facing in a second direction. In sub-step 616 a third pair of images is captured using a third pair of cameras mounted on the camera mounting platform of the camera rig at a third camera pair mounting position while the third pair of cameras is facing in a third direction. Thus in step 610, multiple pairs of images are captured, in parallel, using the multiple camera pairs mounted on the camera rig. In some embodiments capturing the first, second and third pairs of images includes capturing video, in parallel, using the first, second and third camera pairs. In some embodiments the cameras included in each of the first, second and third camera pairs include fish eye lenses allowing the individual cameras of each of the first, second and third camera pairs to capture wide angle views. In some embodiments the first, second and third directions are 120 degrees apart from each other. Operation proceeds from step 610 to step 630.

Referring now to the steps along the alternative path of flowchart 600 starting with step 618. Steps 618 through 626 are performed in embodiments where a single camera pair mounted on the exemplary camera rig is used to capture images. In step 618 a first pair of images is captured using a first pair of cameras mounted on the camera mounting platform of the camera rig at a first camera pair mounting position while the first pair of cameras is facing in a first direction. Operation proceeds from step 618 to step 620. In step 620 the camera mounting platform is rotated, after capturing the first pair of images, to position the first pair of cameras to a second camera mounting position causing the first pair of cameras to face in the second direction.

Operation proceeds from step 620 to step 622. In step 622 a second pair of images is captured using the first pair of cameras while the first pair of cameras is facing in the second direction. Operation proceeds from step 622 to step 624. In step 624 the camera mounting platform is rotated, after capturing the second pair of images, to position the first pair of cameras to a third camera mounting position causing the first pair of cameras to face in a third direction. Operation proceeds from step 624 to step 626. In step 626 a third pair of images is captured using the first pair of cameras while the first pair of cameras is facing in the third direction. Thus by rotating the camera mount on which the first pair of cameras is mounted, images in various different direction, e.g., corresponding to different portions of a 360 degree scene area, are captured. In some embodiments the first direction is a front direction and stereoscopic pairs of images corresponding to the front direction are captured in real time by the first camera pair while an event is ongoing. In some embodiments the second and third directions are left and right rear directions and the stereoscopic image pairs corresponding to the rear left and rear right direction are captured at a time the event is not ongoing, e.g., prior to the start of event or some other time. In some embodiments the captured pairs of images are images of a scene area of interest captured by left and right eye cameras of a pair of cameras. In some embodiments the rotation of the camera mounting platform and image capture is controlled via a control signal sent from a remote device. In some other embodiments the rotation and image capture is manually performed. In some embodiments the rotation of the camera mounting platform, image capture control via camera pairs and/or other operations can be pre-programmed and thus the operation can be automatically performed in accordance with preconfigured settings/instructions. Operation proceeds from step 610 to step 630.

Returning now to step 630. In step 630 one or more captured images, e.g., first, second, third pairs of images, are stored, e.g., in a memory, and/or transmitted to an external device via an interface, and/or output, e.g., to a display device. In some embodiments step 630 includes sub-steps 632, 634 and 636, one or more of which are performed as part of implementing step 630 in some embodiments. In sub-step 632 one or more of the captured image pairs are stored in a memory. In sub-step 634 one or more of the captured image pairs are transmitted to an encoding and content delivery device for further processing and delivery to other receiving devices. In some embodiments step 634 includes transmitting front image pairs, e.g., image pairs corresponding to the front direction, captured in real time during an event and at least one rear image pair captured before the event to a communications system or playback device while the event is ongoing. In sub-step 636 one or more of the captured image pairs are displayed, e.g., on a display device. In various embodiments each camera, in a pair of cameras installed on the camera rig, includes a processor and memory and an output interface. In some embodiments one of the cameras or a computer system including a processor and memory is responsible for controlling the transmission and/or storage of stereoscopic image pairs captured by cameras mounted in said camera rig. Depending on the embodiment, operation proceeds from step 630 back to one of step 610 or step 618 and the operation may proceed in the manner discussed above, e.g., to capture additional images.

Figure 7:
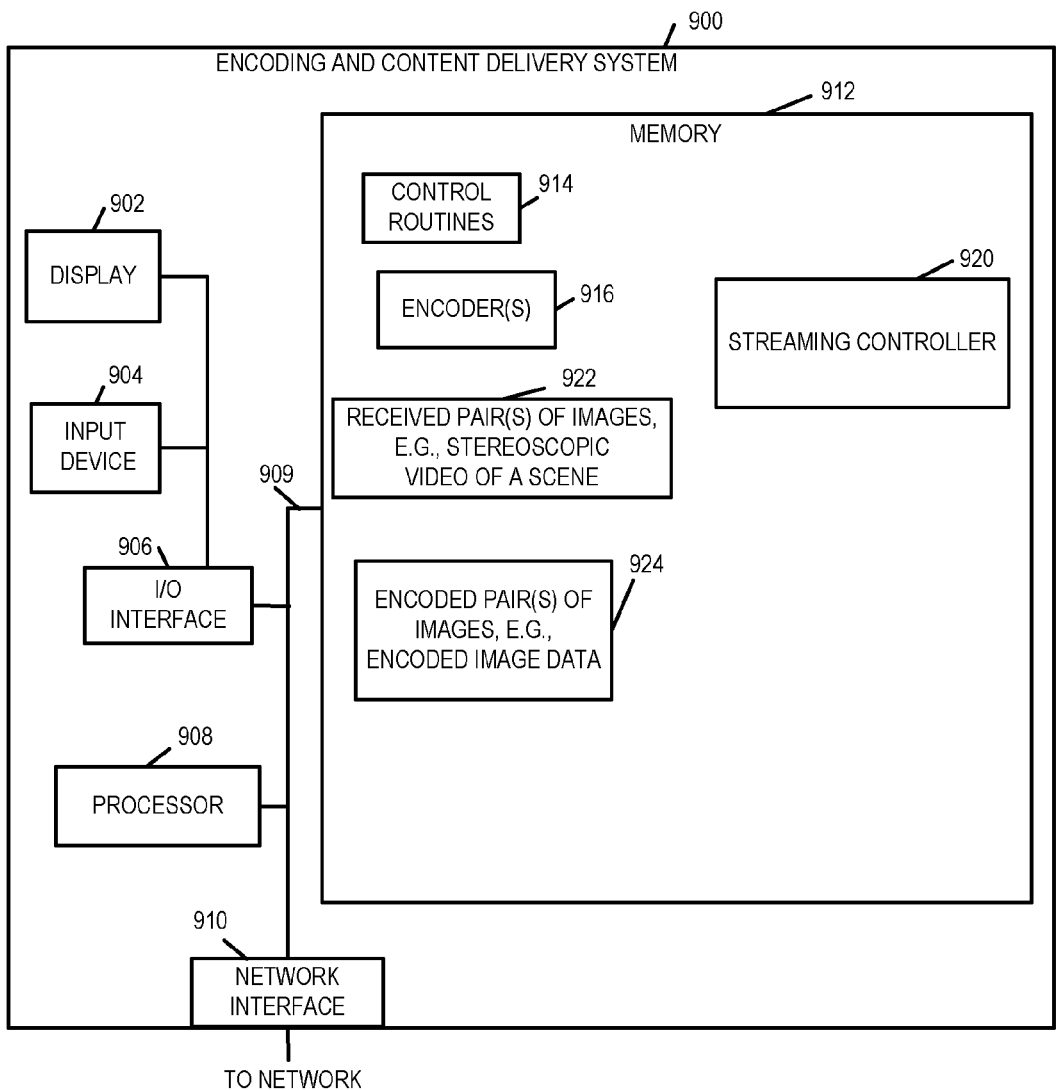
FIG. 7 illustrates an exemplary encoding and content delivery system which may be used in conjunction with the camera rigs shown in any of the other figures.

FIG. 7 illustrates an exemplary encoding and content delivery system 900 in accordance with the features of the invention. The encoding and content delivery system 900 can be used to receive and process imaging content, e.g., pair(s) of images, from an imaging apparatus such as the camera rig with one or more mounted camera pairs. The processing system 900 includes multi-rate encoding capability that can be used to encode and stream stereoscopic imaging content.

The system 900 may be, and in some embodiments is, used to perform, multi-rate encoding operation, storage, and transmission and/or content output in accordance with the features of the invention. The system 900 may also include the ability to decode and display processed and/or encoded image data, e.g., to an operator. The system 900 includes a display 902, input device 904, input/output (I/O) interface 906, a processor 908, network interface 910 and a memory 912. The various components of the system 900 are coupled together via bus 909 which allows for data to be communicated between the components of the system 900.

The memory 912 includes various routines and modules which when executed by the processor 908 control the system 900 to implement the encoding, storage, and streaming/transmission and/or output operations in accordance with the invention.

The display device 902 may be, and in some embodiments is, a touch screen, used to display images, video, information regarding the configuration of the system 900, and/or indicate status of the processing being performed on the processing device. In the case where the display device 902 is a touch screen, the display device 902 serves as an additional input device and/or as an alternative to the separate input device, e.g., buttons, 906. The input device 904 may be, and in some embodiments is, e.g., keypad, touch screen, or similar device that may be used for inputting information, data and/or instructions.

Via the I/O interface 906 the encoding and content delivery system 900 may be coupled to external devices and exchange information and signaling with such external devices, e.g., such as the camera rigs of the present invention and/or one or more cameras mounted on the camera rig. In some embodiments via the I/O interface 906 the encoding and content delivery system 900 receives images captured by the camera pairs mounted on the camera rig. In some embodiments via the I/O interface 906 the processing system 900 can send control signals, e.g., command/instructions to control the operation of the camera rig and/or one or more cameras.

The network interface 910 allows the system 900 to be able to receive and/or communicate information to an external device over a communications network, e.g., a hybrid fiber-coaxial (HFC) network, satellite network, and/or internet. The network interface 910 in some embodiments includes a transmitter and a receiver. The transmitter allows the processing system 900 to send, e.g., broadcast or unicast, multiple encoded stereoscopic data streams to various customer devices, e.g., devices capable of decoding and playback of content including image data captured by the camera in accordance with the invention. In some embodiments the system 900 transmits different portions of a scene, e.g., front portion, left rear portion, right rear portion etc., to customer devices via the transmitter of the interface 910.

The memory 912 includes control routines 914, image encoder(s) 916, streaming controller 920, received pairs of images 922, e.g., stereoscopic image data, and encoded image data including encoded pair(s) of images 924.

In some embodiments the modules are, implemented as software modules. In other embodiments the modules are implemented in hardware, e.g., as individual circuits with each module being implemented as a circuit for performing the function to which the module corresponds. In still other embodiments the modules are implemented using a combination of software and hardware.

The control routines 914 include device control routines and communications routines to control the operation of the system 900. The encoder(s) 916 may, and in some embodiments do, include a plurality of encoders configured to encode received image content, e.g., images of a scene captured by one or more pairs of cameras mounted on a camera rig in accordance with the features of the invention. In some embodiments encoder(s) include multiple encoders with each encoder being configured to encode image pairs corresponding to a scene portion. An output of the encoder(s) 916 is the encoded stereoscopic image data 924 stored in the memory for streaming to customer devices, e.g., playback devices. The encoded content can be streamed to one or multiple different devices via the network interface 910.

The streaming controller 920 is configured to control streaming of encoded content 924 for delivering the encoded image content (e.g., at least a portion of encoded image data 924) to one or more customer playback devices, e.g., over a communications network. In some embodiments the streaming controller 920 is further configured to communicate, e.g., transmit, a depth map of the scene area to one or more customer playback devices, e.g., via the network interface 910.

Received stereoscopic image data 922 includes pairs of images, captured by one or more camera pairs, received by the system 900. Encoded stereoscopic image data 924 includes a plurality of sets of image data which have been encoded by the encoder(s) 916.

Numerous variations on the above described methods and apparatus are possible. In some embodiments the support base 720 include handles for lifting and/or rotating the camera rig.

The overall camera rig excludes the tripod support structure maybe, and in some embodiments is, less than two feet in height making for easy transportation. However, in other embodiments the camera rig is taller and includes a support tower or base which results in the camera rig height approximating the height of a human in a sitting or standing position, e.g., a height of 3-5 feet for a sitting position and a height of between 4 and 7 feet for a standing position. For purposes of transportation the tripod base is normally detached form the support base 720. The cameras may also be removed and packaged in cases for shipping. The camera may be left secured to the mounting plates for shipping purposes.

The camera rigs, excluding the tripod support, shown in FIGS. 1-5 may be placed on a table, stool or other support when in use rather than on a tripod support tower.

The foreground camera position, in some embodiments, is at 0-degrees relative to the scene content. This is the position where, in at least some embodiments the 2 cameras of the first camera pair used to capture the main area of interest, reside. The first camera pair is used to capture real time content in cases where during playback the other two camera positions corresponding to the background are populated with non-real time images often captured as static images prior to the real time event.

Position 2 corresponds to the right 120-degree background camera position. In cases where the second position is not populated with cameras used to capture real time images, this can be viewed as a temporary position or direction to which the cameras of the first camera pair are rotated for the purpose of capturing static images, e.g., prior to an event or during intermissions which occur during the event.

In some embodiments the third camera direction corresponds to a left rear direction which is a 240-degree background camera position relative to the forward 0 degree direction. In embodiments where the camera position corresponding to the third direction is not populated with one or more cameras, this is a temporary position in which the pair of cameras are rotated for the purpose of capturing static images in the third direction, e.g., prior to an event or during intermissions which occur during the event.

The line 150 in FIG. 150 depicts the forward offset value of 117 mm in one particular exemplary embodiment which represents the distance from the panoramic array's center point to a datum registration plane aligned with the bolt holes found on each stereoscopic camera pair. This desired distance in one embodiment should be maintained to achieve a proper simulation of the 6-camera array's (3 pairs) nodal offset at all three positions for the exemplary embodiment. However, this particular distance is not a limitation of all embodiments.

The camera rig provides, in some embodiments, fo and supports 360-degree, stereoscopic, panoramic video capture, with 4K or greater image resolution, high dynamic range, and high frame rates, using an array of professional grade, large-sensor, cinematic cameras.

In some embodiments the rig includes 3 pairs of cameras positioned within the array that allows the rig to acquire a complete, simultaneous 360-degree panorama with 6 cameras. In at least some such embodiments the cameras are used to perform real time image capture of the 360-degree view.

In addition to the camera rig which may be populated with two cameras in some embodiments and more cameras, e.g., 6 cameras in other embodiments, the invention is direct to a method of using such a rig at different times, e.g., with different numbers of cameras depending on the needs of the user and/or other requirements at different points in time.

During use at one point in time, in some embodiments, the camera array is populated with only 2 cameras in two of the 6 mounting positions included in the camera support assembly which forms the backbone of the camera rig. In one such embodiment, the high-value, foreground 180-degree scene elements are captured in real-time while the two other scene views corresponding to the 120 and 240 degree directions are captured at another point in time, e.g., after the pair of cameras is rotated while being mounted in the camera rig, allowing for the capture of static images which are accurately aligned with but offset from, the front scene which is captured in real time. The two background segments maybe of the lower-value, but when combined and/or made available with the front scene captured in real time can provide a compelling 360 degree stereoscopic experience.

The camera support structure of the camera rig maintains the inter-axial separation of each stereoscopic camera pair in a range from 63 mm to 120 mm in some embodiments. In one particular embodiment, an inter-axial separation value of 117 mm is maintained.

Various features also relate to the fact that the camera support structure and camera configuration can, and in various embodiments does, maintain a nodal offset distance in a range from 75 mm to 350 mm. In one particular embodiment, a nodal offset distance of 315 mm is maintained.

The support structure also maintains, in some embodiments an overall area (aka footprint) in a range from 400 $mm^2$ to 700 $mm^2$. In one particular embodiment, an overall area (aka footprint) of 640 $mm^2$ is maintained.

The camera rig has, in some but not all embodiments, a minimal imaging distance in a range from 400 mm to 700 mm. In one particular embodiment, the rig has a minimal imaging distance of 649 mm.

In one particular embodiment the optimal calibration distance of the array is where lens angles of view intersect AND the maximum distortion of the lenses occur. In one particular exemplary embodiment this distance is 743 mm.

As discussed above, in various embodiments the camera array, e.g., rig, is populated with only 2 of the 6-total cameras which would normally be required for simultaneous 360-degree stereoscopic video for the purpose of capturing the high-value, foreground 180-degree scene elements in real-time while manually capturing static images of the lower-value, background 180-degree scene elements.

In some embodiments the front stereoscopic pairs of images are captured in real time while an event is ongoing while the first and second rear stereoscopic image pairs are captured at a time the event is not ongoing.

In some embodiments the method further comprises: storing, in a memory, the captured image pairs. In some embodiments the method further comprises: transmitting the front image pairs captured in real time during an event and at least one rear image pair captured before the event to a communications system or playback device while the event is ongoing.

In some embodiments each camera, e.g., in the camera pairs 702, 704, 706, includes a processor and memory and an output interface. In some embodiments the one of the cameras or a computer system including a processor and memory is responsible for controlling the transmission and/or storage of stereoscopic image pairs captured by cameras mounted in said camera rig. The camera pairs maybe and in some embodiments are covered with a protective covering or case with openings through which the camera lens protrude and/or can capture light.

While various ranges and exemplary values are described the ranges and values are exemplary. In some embodiments the ranges of values are 20% larger than the ranges discussed above. In other embodiments the ranges are 20% smaller than the exemplary ranges discussed above. Similarly, particular values may be, and sometimes are, up to 20% larger than the values specified above while in other embodiments the values are up to 20% smaller than the values specified above. In still other embodiments other values are used.

Some embodiments are directed a non-transitory computer readable medium embodying a set of software instructions, e.g., computer executable instructions, for controlling a computer or other device to encode and compresses stereoscopic video and/or control one or more devices to operate in accordance with one or more of the methods described herein. Other embodiments are embodiments are directed a computer readable medium embodying a set of software instructions, e.g., computer executable instructions, for controlling a computer or other device to decode and decompresses video on the player end. While encoding and compression are mentioned as possible separate operations, it should be appreciated that encoding may be used to perform compression and thus encoding may, in some include compression. Similarly, decoding may involve decompression.

The techniques of various embodiments may be implemented using software, hardware and/or a combination of software and hardware. Various embodiments are directed to apparatus, e.g., image capture and/or an image data processing system. Various embodiments are also directed to methods, e.g., a method of processing image data. Various embodiments are also directed to a non-transitory machine, e.g., computer, readable medium, e.g., ROM, RAM, CDs, hard discs, etc., which include machine readable instructions for controlling a machine to implement one or more steps of a method.

Various features of the present invention are implemented using modules. Such modules may, and in some embodiments are, implemented as software modules. In other embodiments the modules are implemented in hardware. In still other embodiments the modules are implemented using a combination of software and hardware. In some embodiments the modules are implemented as individual circuits with each module being implemented as a circuit for performing the function to which the module corresponds. A wide variety of embodiments are contemplated including some embodiments where different modules are implemented differently, e.g., some in hardware, some in software, and some using a combination of hardware and software. It should also be noted that routines and/or sub-routines, or some of the steps performed by such routines, may be implemented in dedicated hardware as opposed to software executed on a general purpose processor. Such embodiments remain within the scope of the present invention. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods. Accordingly, among other things, the present invention is directed to a machine-readable medium including machine executable instructions for causing a machine, e.g., processor and associated hardware, to perform one or more of the steps of the above-described method(s).

Numerous additional variations on the methods and apparatus of the various embodiments described above will be apparent to those skilled in the art in view of the above description. Such variations are to be considered within the scope.

What is claimed is:

1. A camera rig, said camera rig comprising:
   a support structure including three mounting positions, each mounting position for mounting one or a pair of cameras, each mounting position corresponding to a different 120 degree direction, wherein said support structure includes a camera mounting plate; and
   a support tower to which said support structure is rotatably mounted, said support tower including a tripod base.

2. The camera rig of claim 1, further comprising:
   a first pair of cameras mounted in a first one of said three mounting positions.

3. The camera rig of claim 2, further comprising:
   a second pair of cameras mounted in a second one of said three mounting positions.

4. The camera rig of claim 3, further comprising:
   a third pair of cameras mounted in a third one of said three mounting positions.

5. The camera rig of claim 1, further comprising:
   a single camera mounted in each one of said three mounting positions.

6. A camera rig, said camera rig comprising:
   a support structure including three mounting positions, each mounting position for mounting one or a pair of cameras, each mounting position corresponding to a different 120 degree direction;
   a first pair of cameras mounted in a first one of said three mounting positions;
   a second pair of cameras mounted in a second one of said three mounting positions; and
   a pair of left and right microphones each with an audio input positioned perpendicular to a face of a lens of the first pair of cameras.

7. A method of using a stereoscopic camera rig including at least a first pair of cameras, the method comprising:
   capturing a first pair of images with the first pair of cameras mounted on a camera mounting platform of the rig at a first camera pair mounting position while the first pair of cameras is facing in a first direction, wherein said first direction is a first rear direction;
   rotating the camera mounting platform, after capturing the first pair of images, to position the first pair of cameras to face in a second direction, wherein said second direction is a second rear direction;
   capturing a second pair of images using the first pair of cameras while the first pair of cameras is facing in the second direction;
   rotating the camera mounting platform, after capturing the second pair of images, to position the first pair of cameras to face in a third direction, wherein said third direction is a front direction, and wherein said first, second and third directions are 120 degrees apart from each other; and capturing a third pair of images using the first pair of cameras while the first pair of cameras is facing in the third direction, wherein stereoscopic pairs of images corresponding to said front direction are captured in real time by said first camera pair while an event is ongoing, and wherein stereoscopic pairs of images corresponding to said first and second rear directions are captured at a time the event is not ongoing; and transmitting the pairs of images corresponding to said front direction captured in real time during an event and at least one rear image pair captured before the event to a communications system or playback device while the event is ongoing.

8. The method of claim 7, wherein cameras included in the first pair of cameras include fish eye lenses allowing the individual cameras of each of the first camera pair to capture wide angle views.

\* \* \* \* \*